United States Patent

Baerenwald et al.

[11] Patent Number: 4,566,147
[45] Date of Patent: Jan. 28, 1986

[54] CLIP FOR A WIPER BLADE REFILL

[75] Inventors: Philip M. Baerenwald; Michael G. Mohnach, both of Valparaiso; John J. Plisky, Munster, all of Ind.

[73] Assignee: The Anderson Company of Indiana, Michigan City, Ind.

[21] Appl. No.: 664,698

[22] Filed: Oct. 25, 1984

[51] Int. Cl.⁴ ............................................... B60S 1/38
[52] U.S. Cl. ............................ 15/250.42; 15/250.36
[58] Field of Search ........................ 15/250.36, 250.42

[56] References Cited

U.S. PATENT DOCUMENTS

| | | | |
|---|---|---|---|
| 3,626,544 | 12/1971 | Lopez et al. | 15/250.42 |
| 3,707,741 | 1/1973 | Roberts | 15/250.42 |
| 3,769,653 | 11/1973 | Lopez | 15/250.42 |
| 3,919,736 | 11/1975 | Bourassa et al. | 15/250.42 |
| 3,940,823 | 3/1976 | Rosenbeck | 15/250.42 |
| 4,009,503 | 3/1977 | Sharp | 15/250.42 |
| 4,156,951 | 6/1979 | Sharp | 15/250.42 |
| 4,271,558 | 6/1981 | D'Alba | 15/250.42 |
| 4,388,742 | 6/1983 | Kimber et al. | 15/250.42 |
| 4,389,747 | 6/1983 | Riester | 15/250.42 |
| 4,442,566 | 4/1984 | Sharp | 15/250.42 |

FOREIGN PATENT DOCUMENTS 2036547 12/1979 United Kingdom.

Primary Examiner—Timothy F. Simone
Attorney, Agent, or Firm—Wood, Dalton, Phillips, Mason & Rowe

[57] ABSTRACT

A refill unit for a windshield wiper blade having a resilient wiping element and a backing member with sidewardly extending flanges. A wiper blade superstructure has at least two articulated yokes or holders with claws on one of the yokes or holders engaging the flanges on said backing member. A clip is provided for holding the superstructure assembled with the refill and includes a tab engaging in one of at least two apertures in the backing member. Detents and lugs on the clip seat below the flanges for retaining the clip on the backing member. The clip has forwardly extending legs with hook-shaped parts extending outwardly for engaging the claws on the holder for holding the superstructure assembled on the refill.

6 Claims, 7 Drawing Figures

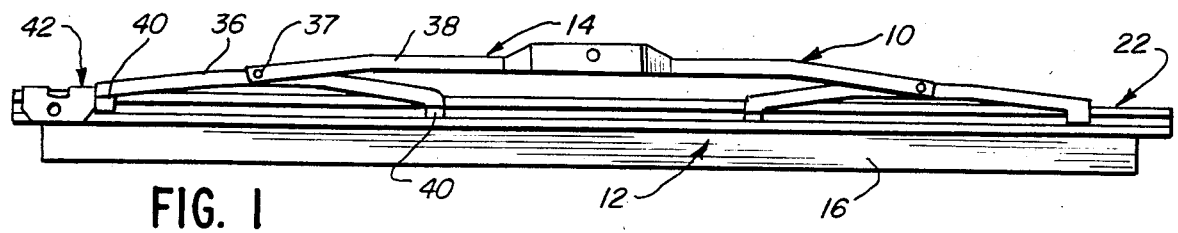
FIG. 1
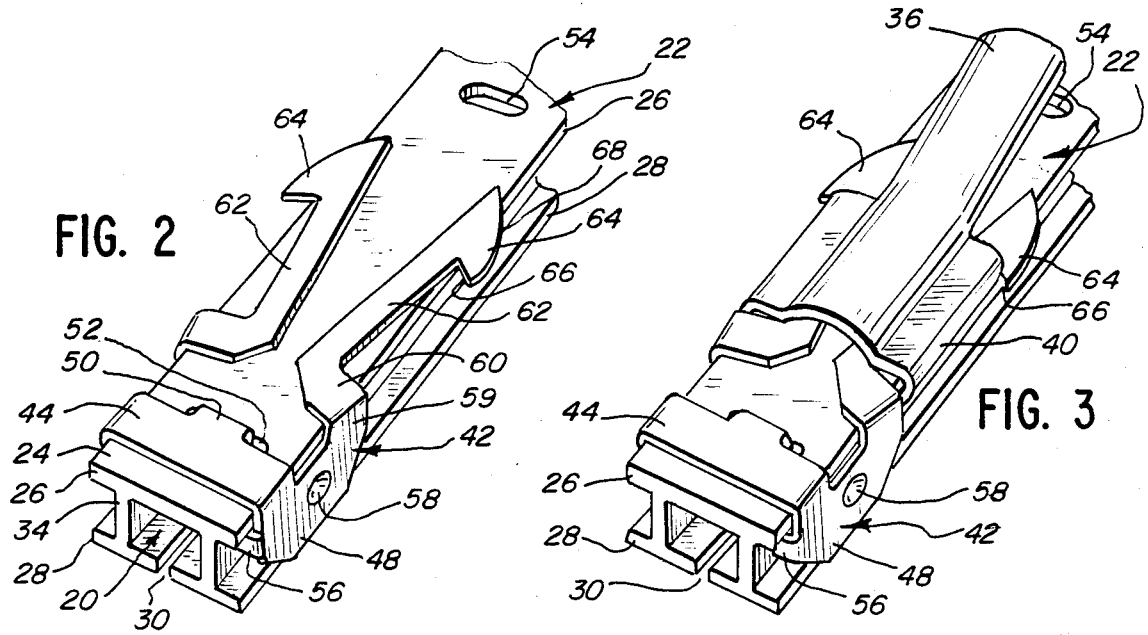
FIG. 2
FIG. 3
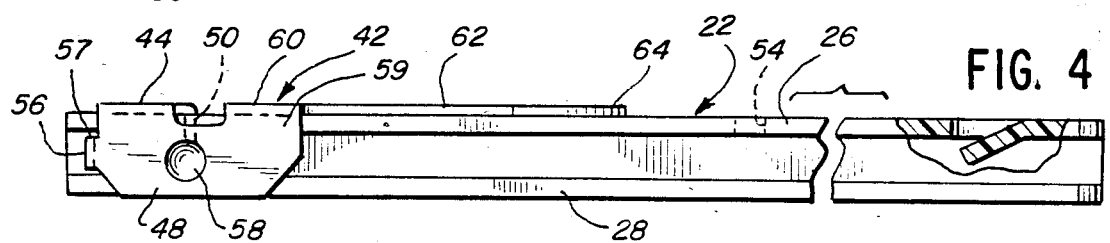
FIG. 4
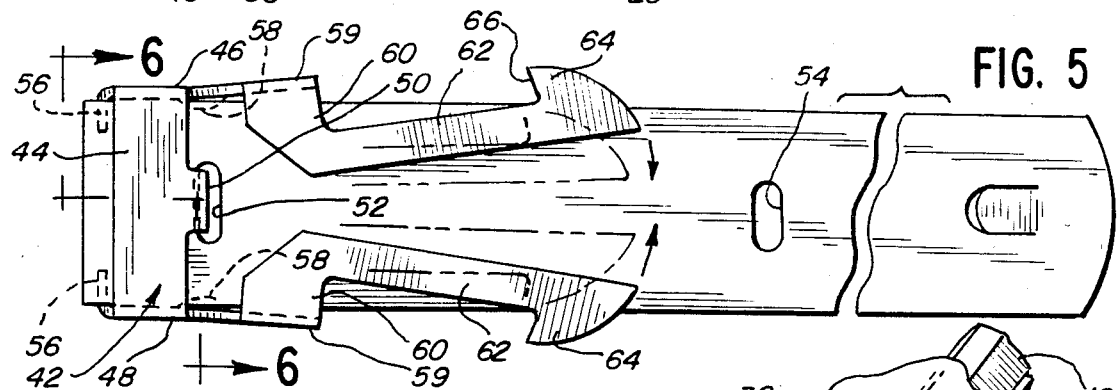
FIG. 5
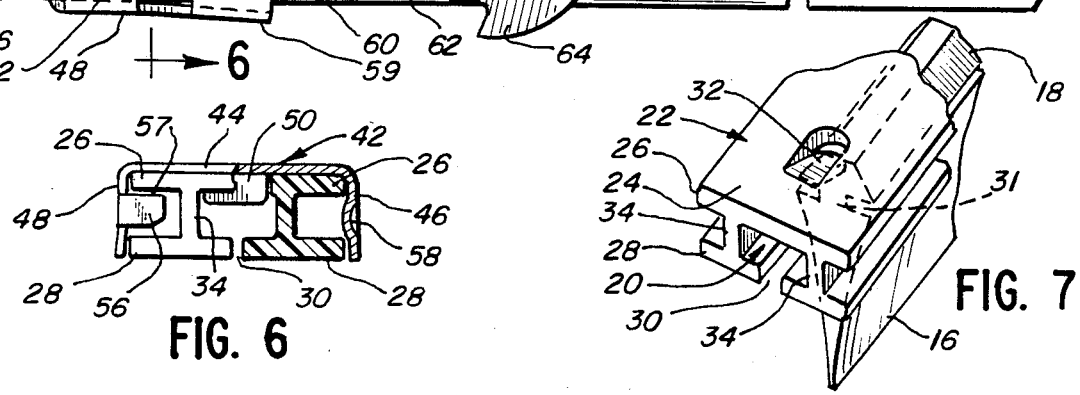
FIG. 6
FIG. 7

CLIP FOR A WIPER BLADE REFILL

DESCRIPTION

1. Field of the Invention

This invention relates to a refill for a windshield wiper blade and more particularly to a clip for the refill.

2. Description of the Prior Art

Refills for wiper blades were first invented by John W. Anderson for use with his blade for wiping curved windshields (U.S. Pat. No. 2,596,063 issued May 6, 1952). Notable patents providing for refills are Anderson U.S. Pat. Nos. 2,757,403, 2,782,447 and 2,782,449. In the early refill patents, end clips were provided on the backing member and/or resilient wiping element which were either removed during assembly of the claws of the superstructure to the backing member or the claws of the superstructure were slid over the depressed end clips. In the intervening years since the late 50's dozens of different forms of refills and clips have been designed and patented, each one being generally to solve a particular problem.

In the early days of wiper blades for wiping curved windshields (U.S. Pat. No. 2,596,063), the backing strip was a thin strip of spring steel which seated in grooves in the sides of the wiping element and which backing strip received the claws of the superstructure. End clips were designed to interengage with the backing strip and resilient wiping element in maintaining its assembled relationship. Recently, the backing strips have been molded of plastic and have side flanges for the claws of the superstructure. Other means had to be devised to hold clips on the molded plastic backing strips especially prior to assembly with the superstructure. Many of the more recent patents address that problem, see for instance, Kimber et al U.S. Pat. No. 4,388,742, Sharp U.S. Pat. No. 4,156,951 and Sharp U.S. Pat. No. 4,442,566. Although the structure of these patents solved one or more existing problems, other problems developed as a result of the structure of the patent. For instance, the Sharp U.S. Pat. No. 4,442,566 structure put slots in the opposite edges of the flanges which weakened the support provided by the support member causing poorer wiping of the windshield and occasional failure of the support member.

THE INVENTION

A wiper blade is provided and has a refill including a resilient wiping element, a backing member have vertically spaced, outwardly directed flanges on each side, and which backing member has a channel for receiving a bead on the back of the wiping element, and a superstructure operatively connected to the backing member at spaced apart points.

In addition, a clip is provided for the refill that has a body portion, spaced side portions and an inturned lug on each side portion. A downturned tab is formed on the body portion with detents pointing inwardly from each side portion. A pair of legs extend forward from horizontal extensions of the side portions and lie in a plane substantially common with the plane of the body portion. Hook-like projections extend outward from the legs to provide overhangs with respect to the legs. The clip is assembled with the backing member at an appropriate location along its length where upon it is pivoted into position with the tab seated in one of the at least two apertures in the backing member. The outboard claws of the superstructure depress the hook-like projections until the claws clear the projections whereupon the superstructure is assembled with the refill.

The clip provides positive retention of the superstructure on the backing member without effecting the quality of the wiping of the windshield. The clip is retained in a selected position along the backing member and can be simply relocated with a pivoting and sliding movement without disassembling the refill.

BRIEF DESCRIPTION OF THE DRAWINGS

These and further features and advantages of the clip arrangement of the present invention will made more apparent in the following description of the preferred embodiment taken together with the drawings in which:

FIG. 1 is a side elevational view of a wiper blade incorporating the clip arrangement of the present invention;

FIG. 2 is a perspective view of a refill having a clip in position thereon;

FIG. 3 is a perspective view similar to FIG. 2 only showing the end claws of a superstructure in engaging position with respect to the clip;

FIG. 4 is a partial side elevational view of the refill with a clip in place;

FIG. 5 is a top view of the refill and clip of FIG. 4;

FIG. 6 is a end view of the clip with part of the clip broken away and in section; and FIG. 7 is a perspective view of one end of the refill showing one way that the resilient wiping element may be retained in the backing member.

BRIEF DESCRIPTION OF THE PREFERRED EMBODIMENT

A windshield wiper blade generally designated by the reference numeral 10 is shown in FIG. 1 and includes a wiper blade refill unit 12 and a pressure applying superstructure 14 operatively engaged with the refill unit. The wiper blade refill unit 12 includes a resilient wiping element 16 having a bead 18 on the back portion thereof which bead is seated in a channel 20 of a backing member 22. The backing member 22 has a body portion 24 with a pair of outwardly extending flanges 26,28 on each side thereof which flanges are vertically spaced apart. The lower flange 28 extends inwardly to define the chamber 20 and is spaced from the comparable inwardly extending flange 28 from the opposite side to form a slot 30 which receives the web 31 between the wiping element 16 and the bead 18 of the wiping element.

To retain the resilient wiping element 16 in the backing member 22 abutments or stops 32 are struck or formed downwardly from the plane of the back of the backing member 22 which abutments or stops 32 engage the opposite ends of the bead 18 to retain the wiping element in the backing member 22. The abutments face the midportion of the blade so as to prevent the trapped resilient wiping element from escaping from the channel 20. As an alternate to the abutment or stop 32, a pair of abutments may be struck in from the vertical webs 34 between the flanges 26,28 which likewise will abut against the ends of the bead 18 to retain the wiping element in the backing member.

The superstructure 14 can be any one of the many well-known types currently on the market and includes at least two yokes or holders 36,38 which articulate relative to each other at pivots 37 with at least one of the yokes or holders 36 having pairs of oppositely disposed claws 40 on the ends thereof, which claws are adapted to wrap around the upper flanges 26 of the backing member 22. A wiper arm, not shown, engages the midportion of holder 38 and applies pressure to the superstructure 14. Pressure from the wiper arm will be distributed to the backing member and to the wiping element at a plurality of longitudinally spaced apart points below the claws 40. As shown, the superstructure 14 is comprised of two yokes or holders 36 pivotally carried by a bridge or holder 38. The yokes 36 have pairs of claws 40 on the opposite ends thereof.

To retain the superstructure 14 assembled with the backing member 22 of the refill unit 12, a clip 42 is provided. The clip 42 as best illustrated in FIGS. 4, 5 and 6 has a body portion 44 spanning the width of the backing member with spaced side portions 46,48 extending downwardly at right angles from the opposite sides of said body portion. The side portions are adapted to encase the outer edges of the flanges 26,28 of the backing member. A tab 50 is bent downwardly at a right angle from the middle of the body portion 44 and is adapted to engage in any one of a plurality of transversely oriented slots or apertures 52,54 formed transverse to the centerline of the back of the body portion 24 of the backing member 22. Which slot or aperture 52,54 will be selected for attachment to the clip 42 will be explained in greater detail hereinafter. One end of the sides 46,48 of the clip have lugs 56 bent inwardly at right angles to the sides 46,48 and project toward each other as best shown in FIGS. 4 and 6. The top surface 57 of the lugs 46 (FIG. 6) are spaced from the plane of the body portion 44 by an amount slightly larger than the thickness of the flanges 26 on the backing member 22. The midportion of the sides 46,48 have inwardly struck detents 58 with the upper extremes of the detents 58 being spaced from the body portion 44 by an amount substantially equal to the thickness of the flanges 26. The detents 58 project inwardly into the space between the side walls 46,48. The front portions 59 of the sides 46,48 project forwardly of the body portion 44 and have inturned plates or horizontal projections 60 lying in a plane substantially common with the plane of the body portion 44. A pair of legs 62 extend forwardly of the plates 60 and at the outer end thereof have sidewardly directed hook-shaped parts 64 which defines an abutment surface 66 spaced from the edges of the plates 60 by an amount slightly greater than the longitudinal lengths of the claws 40 on the superstructure. The portions 59 of the sides 46,48 are biased, bent or flared outwardly along a line substantially aligned with the body portion 44 so as to position the hook-shaped parts 64 outward of the plane of the outer edges of the flanges 26,28.

The refill unit 12 which is comprised of the resilient wiping element 16 and the backing member 22 with the resilient wiping element held in place in the backing member by the abutments 32 struck from the backing member 22 and is supplied with a clip 42 which can be assembled with an appropriate aperture 52 or 54 on the backing member 22 so that the wiping element or refill can be assembled with superstructures 14 of different dimensions.

To assemble the clip 42 on the backing member, the lugs 56 are threaded into the open spaces between the flanges 26,28 with the body 44 of the clip pointing at an approximate 45° angle to the plane of the backing member 22. The clip 42 is moved along the longitudinal length of the backing member 22 until the selected position is located. Thereupon the clip 42 is pivoted about the top edge of the lugs 56 to move the legs 62 toward the backing member 22 with the tab 50 aligned with the appropriate aperture, for instance, aperture 52, whereupon downward pressure on the leg end of the clip will urge the detents 58 against and ultimately over the flanges 26 as the tab 50 enters the aperture 52. The detents 58 will hold the clip from pivoting away from the backing member 22 with the lugs 56 and tab 50 likewise positioning the clip at the appropriate selected position on the backing member. The detents 58 and lugs 56 prevent the clip from being easily removed from the backing member with the tab 50 preventing the clip from moving longitudinally along the length of the backing member. With the clip in position, the hook-shaped parts 64 on the legs 62 will extend sidewardly beyond the planes of the edges of the flanges 26,28. The claws 40 of a superstructure are threaded onto the top flange 26 of the backing member 22 and are threaded substantially the full length of the refill until the outboard claws 40 engage against the curved or sloped leading edge 68 of the hook-shaped parts 64. Further longitudinal pressure on the superstructure relative to the refill will depress the hook-shaped members 64 and legs 62 to permit the claws to pass the high point of the hook-shaped member and seat between the abutments 66 and the forward facing edge of the plates 60. The resilience of the clip will force the hook-shaped elements 64 and legs 62 sidewardly so as to affect a locking action to hold the claws on the superstructure assembled with the refill unit.

The length of the blade or refill 12 with respect to the superstructure 14 will determine the location of the clip 42 along the length of the backing member 22.

The legs 62 and hook-shaped parts 64, as viewed in FIG. 4, are biased downwardly slightly out of the plane of the body portion 44 and plates 60. In this way, with the clip in position, the legs 62 and hook-shaped parts 64 will be urged against the top surface of the backing member 22 which somewhat limits accidental removal of the clip from the refill due to stray elements getting into the space between the hook-shaped member 64 and the backing member which then can be lifted to remove the clip.

The refill element is usable with many different lengths of superstructures and when connected with the superstructure is positively retained in position thereon and has the ability to permit the blade to flex without restraint by providing apertures or slots in the midportion of the backing 22. Accordingly, the pressure when applied to the backing member will be evenly and uniformly distributed to the wiping element according to the relative locations of the pressure points along the length of the refill. The refill can be removed and replaced by depressing the hook-shaped parts 64 and legs 62 until the claws in the superstructure can be moved over the hook-shaped parts 64 and slid the length of the refill.

We claim:

1. A refill unit for removable attachment to a superstructure to form a windshield wiper blade, the refill unit having a resilient wiping element and a backing member carried by the wiping element, and said superstructure having at least two articulated holders with at least one of the holders having claws engaging flanges on said backing member, the improvement comprising clip means having a body portion and spaced downturned side portions engaging the flanges on the backing member, a tab projecting downwardly from a midportion of the body portion and engaging in one of at least two longitudinally spaced apertures in the midportion of the back of the backing member, detents and lugs on each side portion and seating below the plane of the flanges, a pair of legs connected to the side portions and lying in a plane generally common with the plane of the body portion, latch means on each leg lying in the plane of the leg and extending outwardly beyond the side flanges, the claws on the at least one holder seating between the latch means and the side portions of the clip for holding the superstructure assembled on the refill.

2. A refill unit as claimed in claim 1 wherein the detents are formed in the side portions and project toward each other with the upper portions of the detents engaging the lower edges of the flanges.

3. A refill unit as claimed in claim 2 wherein the lugs are formed on the side portions and project toward each other, the lugs having top edges which are spaced from the plane of the body portion and seat below the flanges when the body portion straddles the backing member.

4. A refill unit as claimed in claim 1 wherein the legs are carried by extensions of the side portions, and wherein the latch means are hook-shaped parts on the outer ends of the legs, said legs are resiliently biased apart so as to position the hook-shaped parts outward of the edges of the flanges.

5. In a clip for retaining a refill unit assembled with a superstructure of a wiper assembly, the improvement comprising said clip having a body portion and spaced side portions extending downwardly from said body portion, a tab downwardly extending from said body portion, detents in said side portions projecting inwardly toward each other, lugs on said side portions pointing inwardly toward each other, forwardly extending legs carried by the side portions and lying in a plane generally common with the plane of the body portion and latch means on each leg lying in the plane of the leg and extending outwardly beyond the edge of the leg, said legs being biased apart so that the latch means extend outwardly beyond the planes of the side portions.

6. A refill unit for a windshield wiper blade having a resilient wiping element, a backing member on the wiping element, and a superstructure having at least two articulated holders with at least one of the holders having claws engaging flanges on said backing member, the improvement comprising clip means carried by said backing member and having a body portion and side portions extending downwardly from the body portion and engaging the backing member, a downturned tab on said body portion engaging in one of at least two longitudinally spaced apertures in the back of the backing member, detents in said side portions seating below the plane of the flanges, lugs on said side portions pointing toward each other and seating below said flanges, forwardly extending legs carried by the side portions and lying in a plane generally common with the plane of the body portion, latch means on each leg lying in the plane of the leg and extending beyond the edge of the leg, said legs being biased apart so that said latch means extend outwardly beyond the side flanges on the backing member, at least one claw on said holder being seated between the latch means and the side portions for holding the superstructure assembled on the refill.

* * * * *